United States Patent
Li et al.

(10) Patent No.: US 10,810,099 B2
(45) Date of Patent: *Oct. 20, 2020

(54) COGNITIVE IN-MEMORY API LOGGING

(71) Applicant: International Business Machines Corporation, Armonk, NY (US)

(72) Inventors: Jialin Li, Westford, MA (US); Matthew T. Pellas, Raleigh, NC (US)

(73) Assignee: Internatinal Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/700,412

(22) Filed: Sep. 11, 2017

(65) Prior Publication Data

US 2019/0079843 A1    Mar. 14, 2019

(51) Int. Cl.
*G06F 11/30* (2006.01)
*G06F 11/08* (2006.01)

(52) U.S. Cl.
CPC .......... *G06F 11/3093* (2013.01); *G06F 11/08* (2013.01); *G06F 11/302* (2013.01); *G06F 11/3096* (2013.01); *G06F 2201/865* (2013.01)

(58) Field of Classification Search
CPC ......... G06F 11/302–3696; G06F 11/08; G06F 2201/865
See application file for complete search history.

(56) References Cited

U.S. PATENT DOCUMENTS

| | | | |
|---|---|---|---|
| 4,712,424 A | 12/1987 | Herron | |
| 4,722,220 A | 2/1988 | Herron | |
| 5,864,849 A * | 1/1999 | Bohannon | G06F 11/1471 707/648 |
| 5,893,155 A | 4/1999 | Cheriton | |
| 6,490,594 B1 * | 12/2002 | Lomet | G06F 17/3048 |
| 6,591,228 B1 | 7/2003 | Hall et al. | |
| 6,879,995 B1 | 4/2005 | Chinta et al. | |
| 7,356,590 B2 | 4/2008 | Wilson et al. | |

(Continued)

FOREIGN PATENT DOCUMENTS

WO    WO2016162337 A1    10/2016

OTHER PUBLICATIONS

Zhong et al., MAPO: Mining and Recommending API Usage Patterns, published by Springer-Verlag Berlin Heideberg, pp. 318-343 (Year: 2009).*

(Continued)

*Primary Examiner* — S. Sough
*Assistant Examiner* — Zheng Wei
(74) *Attorney, Agent, or Firm* — Yee & Associates, P.C.

(57) ABSTRACT

Managing application programming interface (API) execution logging is provided. It is determined whether a log trigger definition corresponding to a log include definition is satisfied. In response to determining that the log trigger definition corresponding to the log include definition is satisfied, an execution log of the API is transferred from memory to a file in a storage device. The execution log of the API and a set of API definitions in the file is analyzed using natural language processing to identify a usability context pattern corresponding to the API. A specific set of API log definitions for the API is recommended based on the identified usability context pattern corresponding to the API.

15 Claims, 4 Drawing Sheets

(56) References Cited

U.S. PATENT DOCUMENTS

| | | | |
|---|---|---|---|
| 8,099,627 B1* | 1/2012 | Shah | G06F 11/1438 |
| | | | 714/16 |
| 8,443,381 B2* | 5/2013 | Nagahara | G06F 11/3668 |
| | | | 719/320 |
| 8,555,385 B1* | 10/2013 | Bhatkar | G06F 21/556 |
| | | | 726/22 |
| 8,832,116 B1* | 9/2014 | Chu | G06Q 10/0637 |
| | | | 707/748 |
| 9,104,525 B2* | 8/2015 | Dang | G06F 8/75 |
| 9,116,621 B1 | 8/2015 | Pintiysky et al. | |
| 9,146,787 B2* | 9/2015 | Zhu | G06F 8/74 |
| 9,158,604 B1* | 10/2015 | Christodorescu | G06F 9/54 |
| 9,407,648 B1* | 8/2016 | Pavlyushchik | G06F 9/544 |
| 9,519,464 B2* | 12/2016 | Dang | G06F 8/36 |
| 9,557,889 B2 | 1/2017 | Raleigh et al. | |
| 9,778,968 B1* | 10/2017 | Allen | G06F 9/5011 |
| 9,911,132 B2* | 3/2018 | Groom | G06F 17/30058 |
| 10,282,268 B1* | 5/2019 | Cherian | G06F 11/302 |
| 10,284,660 B1* | 5/2019 | Nene | H04L 67/16 |
| 2004/0199903 A1 | 10/2004 | Iizuka | |
| 2005/0149535 A1* | 7/2005 | Frey | G06F 11/3636 |
| 2009/0103902 A1 | 4/2009 | Matsuura et al. | |
| 2011/0067040 A1 | 3/2011 | Nagahara et al. | |
| 2011/0099068 A1* | 4/2011 | Takano | G06Q 30/02 |
| | | | 705/14.54 |
| 2012/0072888 A1* | 3/2012 | Sugimoto | G06F 11/3013 |
| | | | 717/128 |
| 2012/0166869 A1 | 6/2012 | Young et al. | |
| 2013/0091571 A1* | 4/2013 | Lu | G06F 21/563 |
| | | | 726/23 |
| 2013/0283370 A1* | 10/2013 | Vipat | G06F 21/44 |
| | | | 726/17 |
| 2014/0074843 A1* | 3/2014 | White | G06Q 10/107 |
| | | | 707/737 |
| 2014/0207932 A1 | 7/2014 | Hyo | |
| 2014/0366118 A1 | 12/2014 | Yin | |
| 2015/0082430 A1 | 3/2015 | Sridhara et al. | |
| 2015/0082441 A1* | 3/2015 | Gathala | G06F 9/541 |
| | | | 726/25 |
| 2015/0128156 A1* | 5/2015 | Zhu | G06F 8/74 |
| | | | 719/328 |
| 2015/0230108 A1* | 8/2015 | Sridhara | H04W 24/08 |
| | | | 455/405 |
| 2015/0269212 A1* | 9/2015 | Kramer | G06F 16/2358 |
| | | | 707/687 |
| 2015/0278069 A1* | 10/2015 | Arora | G06F 11/3466 |
| | | | 717/130 |
| 2015/0339376 A1* | 11/2015 | Wieweg | G06F 17/30654 |
| | | | 707/739 |
| 2016/0019102 A1* | 1/2016 | Cui | G06F 9/542 |
| | | | 719/328 |
| 2016/0217029 A1* | 7/2016 | Yoon | G06F 21/52 |
| 2016/0246854 A1* | 8/2016 | Pathak | G06F 17/30463 |
| 2017/0012941 A1* | 1/2017 | Subbarayan | H04L 69/16 |
| 2017/0026254 A1* | 1/2017 | Adylov | H04L 43/04 |
| 2017/0046217 A1* | 2/2017 | Shinde | G06F 11/0709 |
| 2018/0068115 A1 | 3/2018 | Golovkin et al. | |
| 2018/0089055 A1* | 3/2018 | Nagata | G06F 11/0787 |
| 2018/0091536 A1* | 3/2018 | Chrosziel | H04L 63/1425 |
| 2018/0152356 A1* | 5/2018 | Dhariwal | H04L 41/22 |
| 2018/0189130 A1* | 7/2018 | Mowry | G06F 11/0781 |
| 2019/0012217 A1* | 1/2019 | Twist | G06F 9/542 |

OTHER PUBLICATIONS

Upadhyays et al., An approach for mining service composition patterns from execution logs, published by Journal of Software: Evolution and Process, J. Softw. Evol. and Proc. 2013; 25:841-870, pp. 841-870 (Year: 2013).*

"Cognitive help for software applications and system", IP.Com Prior Art Database Technical Disclosure No. IPCOM000244409D, dated Dec. 9 , 2015, 4 pages.

"Method for Predictive Elevating Heterogeneous System for Monitoring in Regards to Capturing Complex Events", IP.com Prior Art Technical Database Technical Disclosure No. IPCOM000216781D, dated Apr. 19, 2012, 8 pages.

List of IBM Patents and Applications Treated as Related, dated Dec. 7, 2017, 2 pages.

Office Action dated Sep. 7, 2018, regarding U.S. Appl. No. 15/836,971, 32 pages.

Office Action, dated Mar. 8, 2019, regarding U.S. Appl. No. 15/836,971, 34 pages.

* cited by examiner

COGNITIVE IN-MEMORY API LOGGING

BACKGROUND

1. Field

The disclosure relates generally to application programming interface (API) logging and more specifically to managing cognitive API execution in-memory logging based on user-defined API log definitions that reduce an amount of information contained within a log file corresponding to a specified API.

2. Description of the Related Art

Logs are commonly used to analyze API issues. Typically, only an information or error level logging is turned on by default to avoid increased overhead on system performance. Also, by having detailed logging turned on, a system may generate too much information in log files, which may quickly grow to gigabits in verbose mode. A verbose logging mode is an available option in many systems that provides additional details as to what an API is doing while executing. This level of detail can be very helpful for troubleshooting API problems. In other words, verbose logging records more information than the typical logging modes, but may slow down system performance. This makes it difficult to analyze specific problems without external tooling or intervention to help scrape API logs to pull out relevant information on a particular problem. Even in these cases, the external tooling is limited and fixed.

One common problem is that a user will turn on logging to a finer granular level on some set of components or code packages after some issue is reported. In many cases, this requires a restart of the system to enable the finer-grained logging to be turned on, which causes downtime for clients. Also, the problem may not always be easily replicated. For example, when a particular API has a reported problem, the system administrator enables logging for that particular API. However, after logging is enabled and after another five hundred invocations of that particular API, the problem happens again. The key issues in this example are: 1) performance overhead involved with the logging all five hundred API invocations and writing that information to hard disk or a log server; and 2) large log files containing a multitude of unnecessary information, such as tens of gigabits of data with only five lines of relevant log data relating to the problem.

Another common problem is that many times the troubleshooting engineer knows what to trace at a finer granular level (e.g., a specific API call in an e-commerce system for a specific shopper identification (ID) or for a specific product ID in an e-commerce API). Unfortunately, without a complex logging mechanism and development effort, the troubleshooting engineer is limited to a much larger trace log, which records unnecessary data that takes up disk space, consumes memory during tracing, increases CPU utilization, and the like.

SUMMARY

According to one illustrative embodiment, a computer system for managing application programming interface (API) execution logging is provided. The computer system determines whether a log trigger definition corresponding to the API listed in the log include definition is satisfied. In response to the computer system determining that the log trigger definition corresponding to the API listed in the log include definition is satisfied, the computer system transfers the execution log of the API from a memory to a file in a storage device of the computer system. The computer system analyzes the execution log of the API and a set of API definitions in the file using natural language processing to identify a usability context pattern corresponding to the API. The computer system recommends a specific set of API log definitions for the API based on the identified usability context pattern corresponding to the API. According to another illustrative embodiment, a computer program product for managing API execution logging is provided.

DETAILED DESCRIPTION

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
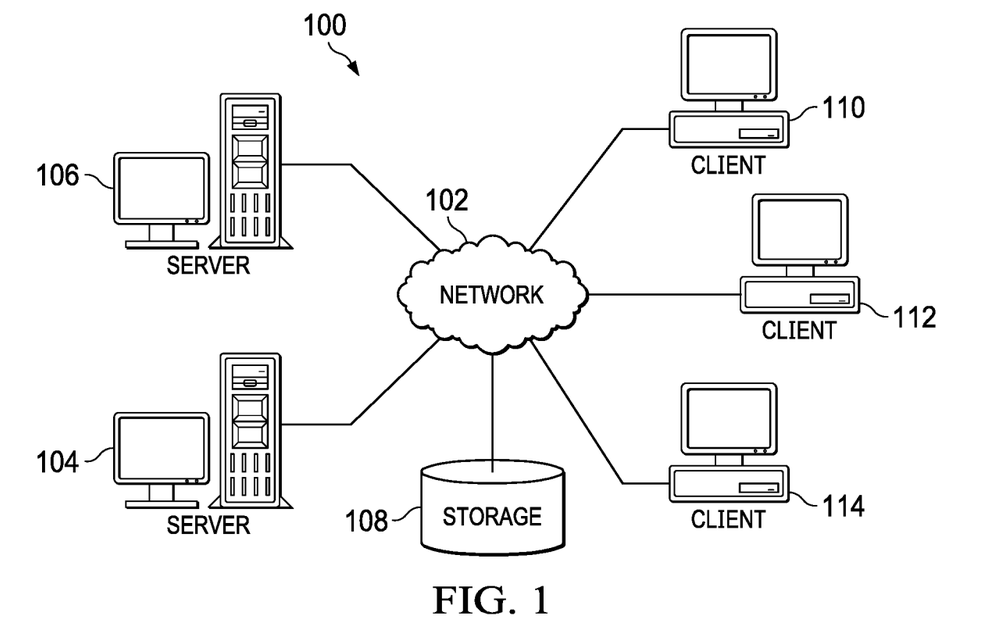
FIG. 1 is a pictorial representation of a network of data processing systems in which illustrative embodiments may be implemented.
Figure 2:
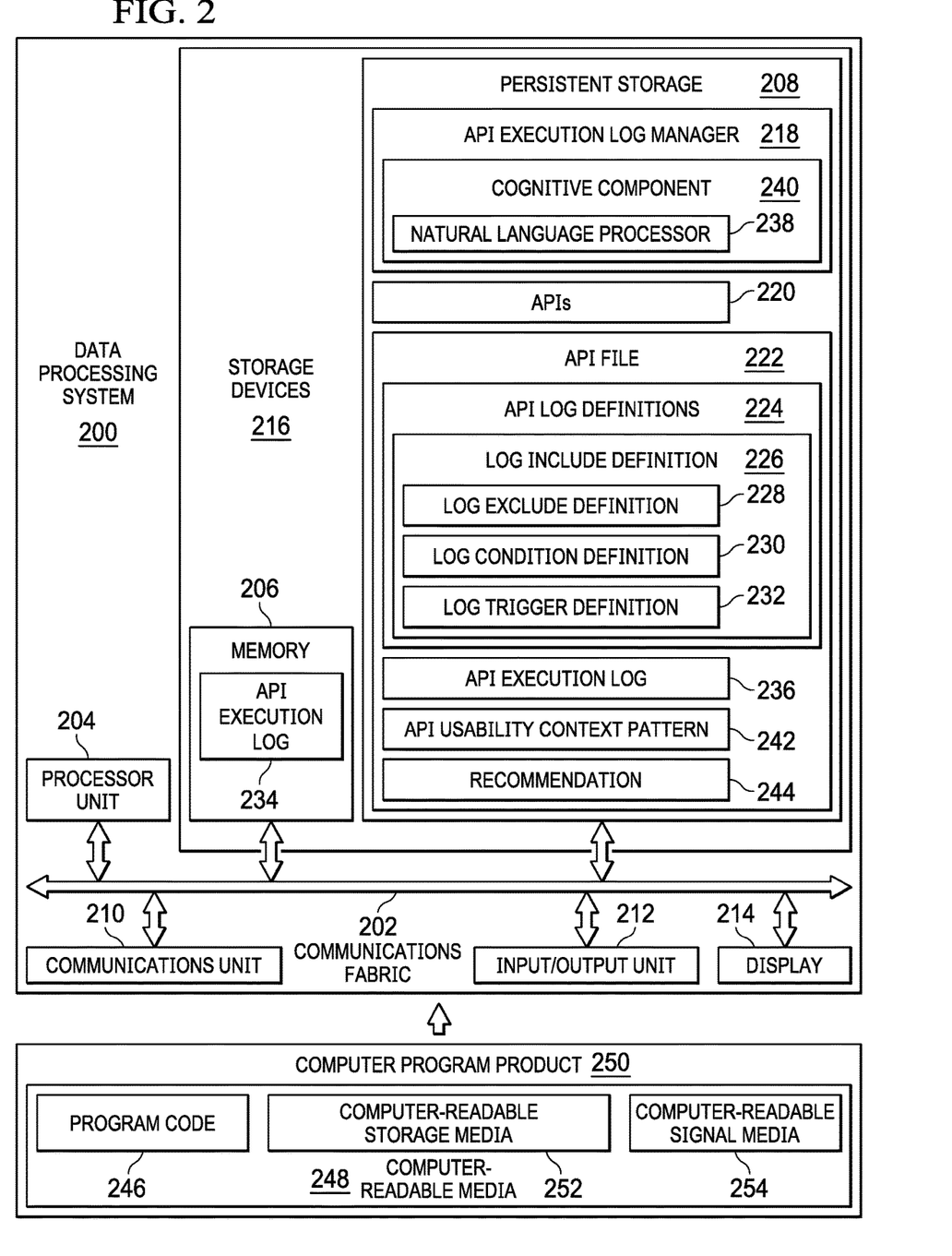
FIG. 2 is a diagram of a data processing system in which illustrative embodiments may be implemented.

With reference now to the figures, and in particular, with reference to FIG. 1 and FIG. 2, diagrams of data processing environments are provided in which illustrative embodiments may be implemented. It should be appreciated that FIG. 1 and FIG. 2 are only meant as examples and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers, data processing systems, and other devices in which the illustrative embodiments may be implemented. Network data processing system 100 contains network 102, which is the medium used to provide communications links between the computers, data processing systems, and other devices connected together within network data processing system 100. Network 102 may include connections, such as, for example, wire communication links, wireless communication links, and fiber optic cables.

In the depicted example, server 104 and server 106 connect to network 102, along with storage 108. Server 104 and server 106 may be, for example, server computers with high-speed connections to network 102. Also, it should be noted that server 104 and server 106 may each represent a plurality of different servers. In this example, server 104 and server 106 provide configurable API execution logging management services.

For example, server 104 provides a configurable API logging component so that a system user, such as a support engineer or a system administrator, is able to define under what conditions to collect log/trace data into a memory device of server 104. The configurable API logging component also allows the system user to define a "log trigger" so that when the log trigger is satisfied, server 104 writes or transfers the log/trace data from memory to a file stored on a hard disk of server 104 for consumption by the system user and/or a cognitive component of server 104. The log/trace data transfer may be a one-time data dump from memory to disk. Alternatively, for more heavily logged scenarios, a data size limit may force the data dump from memory to disk. Thus, illustrative embodiments not only decrease the performance overhead (e.g., storage and processor utilization) of server 104 for verbose logging, but also the log file is more consumable by only containing relevant information corresponding to the defined log trigger that the system user wants to analyze. Further, illustrative embodiments do not require restart of server 104 to implement and perform the user-defined API execution logging. It should be noted that API as used herein may mean a representational state transfer (REST) API corresponding to a web service, a call stack corresponding to an object-oriented program, and the like.

As an example, the system user may define API execution logging at a verbose level for an "createOrder API" (i.e., an API log include definition) for client user "Tom" (i.e., a log condition definition) when a response time of the createOrder API is greater than four seconds or a specified exception, such as "ABCException", occurs during execution of the createOrder API (i.e., a log trigger definition). As a result, when client user Tom invokes the createOrder API, server 104 starts recording the log data for the createOrder API in memory. If the response time of the createOrder API is greater than the four second performance threshold or the specified exception occurs during execution of the createOrder API, then server 104 transfers the log data from memory to disk for analysis by the system user and/or the cognitive component of server 104 to resolve the problems or issues associated with the createOrder API and/or make recommendations for future API execution logging definitions for the createOrder API or similar application programming interfaces (APIs).

Thus, server 104 provides API execution logging capabilities that are able to limit the amount of information contained in an API execution log based only on a specific API listed in an API log include definition, a log condition definition, and a log trigger definition that the system user defined. In other words, server 104 only includes in-depth logging on specified APIs that the system user wants to include in the logging process. Further, server 104 has an ability to exclude the log recording of other APIs listed in an API exclude definition decreasing the I/O footprint of the logging components and utilization of data processing components of server 104. Consequently, server 104 provides an in-depth API execution log that is tailored to only the specified API, the log condition definition, and log trigger definition defined by the system user.

Client 110, client 112, and client 114 also connect to network 102. Clients 110, 112, and 114 are clients of server 104 and server 106. In this example, clients 110, 112, and 114 are illustrated as desktop or personal computers with wire communication links to network 102. However, it should be noted that clients 110, 112, and 114 are meant as examples only. In other words, clients 110, 112, and 114 may include other types of data processing systems, such as, for example, network computers, laptop computers, handheld computers, smart phones, smart televisions, smart watches, gaming devices, kiosks, and the like, with wire or wireless communication links to network 102. Users of clients 110, 112, and 114 may utilize clients 110, 112, and 114 to access one or more web service APIs corresponding to server 104 and server 106 to perform a task or function, such as transferring monetary funds between bank accounts online.

Storage 108 is a network storage device capable of storing any type of data in a structured format or an unstructured format. In addition, storage 108 may represent a plurality of network storage devices. Storage 108 may store, for example, a plurality of different APIs and their corresponding names and identifiers; a plurality of different API execution log files; a plurality of different user-defined API log definitions; a plurality of different system-recommended API log definitions; names and identifiers for a plurality of different client device users; and the like. Further, storage 108 may store other data, such as authentication or credential data that may include user names, passwords, and biometric data associated with support engineers and system administrators, for example.

In addition, it should be noted that network data processing system 100 may include any number of additional server computers, client devices, and other devices not shown. Program code located in network data processing system 100 may be stored on a computer readable storage medium and downloaded to a computer or data processing system for use. For example, program code may be stored on a computer readable storage medium on server 104 and downloaded to client 110 over network 102 for use on client 110.

In the depicted example, network data processing system 100 may be implemented as a number of different types of communication networks, such as, for example, an internet, an intranet, a local area network (LAN), a wide area network (WAN), or any combination thereof. FIG. 1 is intended as an example, and not as an architectural limitation for the different illustrative embodiments.

With reference now to FIG. 2, a diagram of a data processing system is depicted in accordance with an illustrative embodiment. Data processing system 200 is an example of a computer, such as server 104 in FIG. 1, in which computer readable program code or program instructions implementing processes of illustrative embodiments may be located. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software applications and programs that may be loaded into memory 206. Processor unit 204 may be a set of one or more hardware processor devices or may be a multi-processor core, depending on the particular implementation. Further, processor unit 204 may be implemented using one or more heterogeneous processor systems, in which a main processor is present with secondary processors on a single chip. As another illustrative example, processor unit 204 may be a symmetric multi-processor system containing multiple processors of the same type.

Memory 206 and persistent storage 208 are examples of storage devices 216. A computer readable storage device is any piece of hardware that is capable of storing information, such as, for example, without limitation, data, computer readable program code in functional form, and/or other suitable information either on a transient basis and/or a persistent basis. Further, a computer readable storage device excludes a propagation medium. Memory 206, in these examples, may be, for example, a random-access memory, or any other suitable volatile or non-volatile storage device. Persistent storage 208 may take various forms, depending on the particular implementation. For example, persistent storage 208 may contain one or more devices. For example, persistent storage 208 may be a hard drive, a flash memory, a rewritable optical disk, a rewritable magnetic tape, or some combination of the above. The media used by persistent storage 208 may be removable. For example, a removable hard drive may be used for persistent storage 208.

In this example, persistent storage 208 stores API execution log manager 218. API execution log manager 218 controls API execution logging based on user-defined API log definitions that reduce an amount of information contained within a log file corresponding to a specified API. It should be noted that even though API execution log manager 218 is illustrated as residing in persistent storage 208, in an alternative illustrative embodiment API execution log manager 218 may be a separate component of data processing system 200. For example, API execution log manager 218 may be a hardware component coupled to communication fabric 202 or a combination of hardware and software components. In another alternative illustrative embodiment, a first set of components of API execution log manager 218 may be located in data processing system 200 and a second set of one or more components of API execution log manager 218 may be located in a log server, such as server 106 in FIG. 1.

In this example, persistent storage 208 also stores APIs 220 and API file 222. APIs 220 represent a plurality of different APIs that when invoked perform a plurality of different web services or functions. It should be noted that a user of a client device, such as client 110 in FIG. 1, another server, or data processing system 200, itself, may invoke an API in APIs 220. APIs 220 also include names and identifiers for each of the plurality of different APIs.

In this example, API file 222 includes API log definitions 224. A user of data processing system 200, such as, for example, a support engineer, defines API log definitions 224. API execution log manager 218 utilizes API log definitions 224 to control the process of recording the execution logs of one or more specified APIs in APIs 220. API log definitions 224 include log include definition 226, log exclude definition 228, log condition definition 230, and log trigger definition 232. Log include definition 226 specifies one or more names or identifiers of particular APIs in APIs 220 that the support engineer wants API execution log manager 218 to perform detailed (e.g., verbose level) logging on. It should be noted that log exclude definition 228, log condition definition 230, and log trigger definition 232 correspond to the specified API or APIs listed in log include definition 226.

Log exclude definition 228 specifies the names or identifiers of the APIs to be excluded in the detailed logging. Log condition definition 230 describes the condition under which the detailed logging of the specified API is to be recorded in memory 206. Log trigger definition 232 identifies the condition under which the data corresponding to the detailed logging of the specified API, which is recorded in memory 206, is to be transferred or written to persistent storage 208.

In response to API execution log manager 218 determining that log condition definition 230 corresponding to the API specified in log include definition 226 is not met, then API execution log manager 218 does not record any API logging data in memory 206. In response to API execution log manager 218 determining that log condition definition 230 corresponding to the specified API is met, then API execution log manager 218 records the detailed logging of the specified API (i.e., API execution log 234) in memory 206. In response to API execution log manager 218 determining that execution of the specified API has stopped due to, for example, successful execution of the specified API or occurrence of an exception, then API execution log manager 218 determines whether log trigger definition 232 corresponding to the specified API has been satisfied. In response to API execution log manager 218 determining that log trigger definition 232 corresponding to the specified API has been satisfied, API execution log manager 218 transfers API execution log 234 from memory 206 to persistent storage 208, shown as API execution log 236. In other words, API execution 236 is the same as API execution log 234 in this example. In response to API execution log manager 218 determining that log trigger definition 232 corresponding to the specified API has not been satisfied, API execution log manager 218 deletes API execution log 234 from memory 206 and does not transfer API execution log 234 to persistent storage 208.

In this example, API execution log manager 218 utilizes natural language processor 238 of cognitive component 240 to analyze API execution log 236. However, it should be noted that API execution log manager 218 may include more or fewer components than shown. For example, different illustrative embodiments may combine the two components into one component, divide one component into two or more components, or add other components not shown. In addition, it should be noted that API execution log 236 may represent a plurality of different API execution logs stored in persistent storage 208.

After analyzing API execution log 236 using natural language processing, natural language processor 238 generates API usability context pattern 242. API usability context pattern 242 represents the support engineer's desired usability of the specified API. Cognitive component 240 generates recommendation 244, which contains a recommendation of one or more specific API log definitions corresponding to the specified API based on API usability context pattern 242 generated by natural language processor 238. API execution log manager 218 outputs recommendation 244 to the support engineer on display 214, for example.

Thus, illustrative embodiments improve the functioning of data processing system 200 by decreasing utilization of memory space for log data based on an API include definition, decreasing the number of APIs being logged based on an API log exclude definition, decreasing the number and size of API execution logs based on an API log condition definition, and decreasing the number of API execution logs stored and analyzed in persistent storage 208 based on an API log trigger definition, which results in increased free disk space, decreased memory consumption, and decreased processor utilization during API execution data logging and analysis.

Communications unit 210, in this example, provides for communication with other computers, data processing systems, and devices via a network, such as network 102 in FIG. 1. Communications unit 210 may provide communications using both physical and wireless communications links. The physical communications link may utilize, for example, a wire, cable, universal serial bus, or any other physical technology to establish a physical communications link for data processing system 200. The wireless communications link may utilize, for example, shortwave, high frequency, ultra high frequency, microwave, wireless fidelity (Wi-Fi), Bluetooth® technology, global system for mobile communications (GSM), code division multiple access (CDMA), second-generation (2G), third-generation (3G), fourth-generation (4G), 4G Long Term Evolution (LTE), LTE Advanced, or any other wireless communication technology or standard to establish a wireless communications link for data processing system 200.

Input/output unit 212 allows for the input and output of data with other devices that may be connected to data processing system 200. For example, input/output unit 212 may provide a connection for user input through a keyboard, keypad, and/or some other suitable input device. Display 214 provides a mechanism to display information to a user, such as the support engineer or system administrator. Display 214 also may include touch screen capabilities to allow the user to make on-screen selections through user interfaces or input data, for example.

Instructions for the operating system, applications, and/or programs may be located in storage devices 216, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer-implemented program instructions, which may be located in a memory, such as memory 206. These program instructions are referred to as program code, computer usable program code, or computer readable program code that may be read and run by a processor in processor unit 204. The program code, in the different embodiments, may be embodied on different physical computer readable storage devices, such as memory 206 or persistent storage 208.

Program code 246 is located in a functional form on computer readable media 248 that is selectively removable and may be loaded onto or transferred to data processing system 200 for running by processor unit 204. Program code 246 and computer readable media 248 form computer program product 250. In one example, computer readable media 248 may be computer readable storage media 252 or computer readable signal media 254. Computer readable storage media 252 may include, for example, an optical or magnetic disc that is inserted or placed into a drive or other device that is part of persistent storage 208 for transfer onto a storage device, such as a hard drive, that is part of persistent storage 208. Computer readable storage media 252 also may take the form of a persistent storage, such as a hard drive, a thumb drive, or a flash memory that is connected to data processing system 200. In some instances, computer readable storage media 252 may not be removable from data processing system 200.

Alternatively, program code 246 may be transferred to data processing system 200 using computer readable signal media 254. Computer readable signal media 254 may be, for example, a propagated data signal containing program code 246. For example, computer readable signal media 254 may be an electro-magnetic signal, an optical signal, and/or any other suitable type of signal. These signals may be transmitted over communication links, such as wireless communication links, an optical fiber cable, a coaxial cable, a wire, and/or any other suitable type of communications link. In other words, the communications link and/or the connection may be physical or wireless in the illustrative examples. The computer readable media also may take the form of non-tangible media, such as communication links or wireless transmissions containing the program code.

In some illustrative embodiments, program code 246 may be downloaded over a network to persistent storage 208 from another device or data processing system through computer readable signal media 254 for use within data processing system 200. For instance, program code stored in a computer readable storage media in a data processing system may be downloaded over a network from the data processing system to data processing system 200. The data processing system providing program code 246 may be a server computer, a client computer, or some other device capable of storing and transmitting program code 246.

The different components illustrated for data processing system 200 are not meant to provide architectural limitations to the manner in which different embodiments may be implemented. The different illustrative embodiments may be implemented in a data processing system including components in addition to, or in place of, those illustrated for data processing system 200. Other components shown in FIG. 2 can be varied from the illustrative examples shown. The different embodiments may be implemented using any hardware device or system capable of executing program code. As one example, data processing system 200 may include organic components integrated with inorganic components and/or may be comprised entirely of organic components excluding a human being. For example, a storage device may be comprised of an organic semiconductor.

As another example, a computer readable storage device in data processing system 200 is any hardware apparatus that may store data. Memory 206, persistent storage 208, and computer readable storage media 252 are examples of physical storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Illustrative embodiments provide API-level logging. API-level logging causes generation of a log/trace when an API is invoked. An API may be, for example, a REST API corresponding to a web service, a call stack corresponding to an object-oriented program, or the like. A user, such as, a support engineer or system administrator, creates a set of API log definitions. The set of API definitions define what APIs are to be logged and under what conditions. The set of API definitions include an API log include definition, an API log exclude definition, an API log condition definition, and an API log trigger definition.

The API log include definition specifies the name and/or identifier of each API that is to be included in detailed (e.g., verbose or highly granular) execution logging. The API log exclude definition specifies the name and/or identifier of each API not to be included in (i.e., excluded from) the detailed logging process. The API log condition definition describes the condition or conditions under which the API-level logging is to be recorded in memory. The API log trigger definition describes the condition or conditions under which the API execution log data in memory to is to be transferred or written to a hard disk file or a log server.

As an example, a support engineer wants to use illustrative embodiments to define a log/trace in verbose level for a specified API, such as a "createOrder API", for an online shopper "Tom", when the response time for the specified API is longer than 4 seconds or a specified exception, such as "ABCException", occurs during execution of the specified API. The support engineer would write this example API log definition as:

```
include = createOrderAPI
exclude = * (all other APIs)
condition = request.shopperId='Tom' (or session.shopperId='Tom')
trigger = responseTime>4s && exception=ABCException.
```

When the specified API (e.g., the createOrderAPI) is invoked, API execution logging begins. Specifically, when the log condition definition (e.g., request.shopperId='Tom') is satisfied for the specified API, then illustrative embodiments start recording the log/trace in memory. Alternatively, if the log condition definition for the specified API is not satisfied, then illustrative embodiments do not record the log/trace in memory (i.e., illustrative embodiments do not perform a log/trace).

Upon successful execution of the specified API or exiting execution of the specified API with an exception, then illustrative embodiments check whether the log trigger definition (e.g., responseTime>4 s or ABCException) is satisfied. If the log trigger definition is satisfied, then illustrative embodiments write the log/trace data from memory to a disk file or a log server. If the log trigger definition is not satisfied, then illustrative embodiments delete or discard the log/trace data in memory.

When a support engineer creates a set of API log definitions, illustrative embodiments cognitively learn from historical API log definitions for same or similar API issues previously recorded on hard disk and recommend specific API log definitions to the support engineer. Using the example above, illustrative embodiments may recommend one or more specific API log trigger definitions, such as, for example, a specific response time and/or a specific exception type, the next time the support engineer defines an API log trigger definition corresponding to a particular shopper or shopper ID. Over time, illustrative embodiments collect useful data based on the previously used API log definitions. Thus, illustrative embodiments are able to recommend to the support engineer specific API log trigger definitions used most often for a particular shopper ID so that the support engineer does not have to create trigger definitions from scratch.

Moreover, illustrative embodiments also may provide additional API log include definitions and API log trigger definitions based on analyzing the stored historical data. For example, if a trigger corresponding to a particular exception type (e.g., ABCException) appears to have a significant impact on the system, then illustrative embodiments may recommend this information to other support engineers also needing to know in-depth details regarding a createShipmentAPI to get to the root cause of an issue with that particular API. Ultimately, the recommendations provided by illustrative embodiments may get to a level where the support engineer only needs to have minimal knowledge of an API issue to provide an include, trigger, or condition definition to get an optimal log with minimum impact on system performance.

As a result, illustrative embodiments may trigger API execution logging only when a particular API performance threshold is met or exceeded. Illustrative embodiments may utilize natural language processing to analyze the stored historical log definition data and a cognitive component to make recommendations to support engineers to determine which API log definitions to use for a particular API.

Figure 3A:
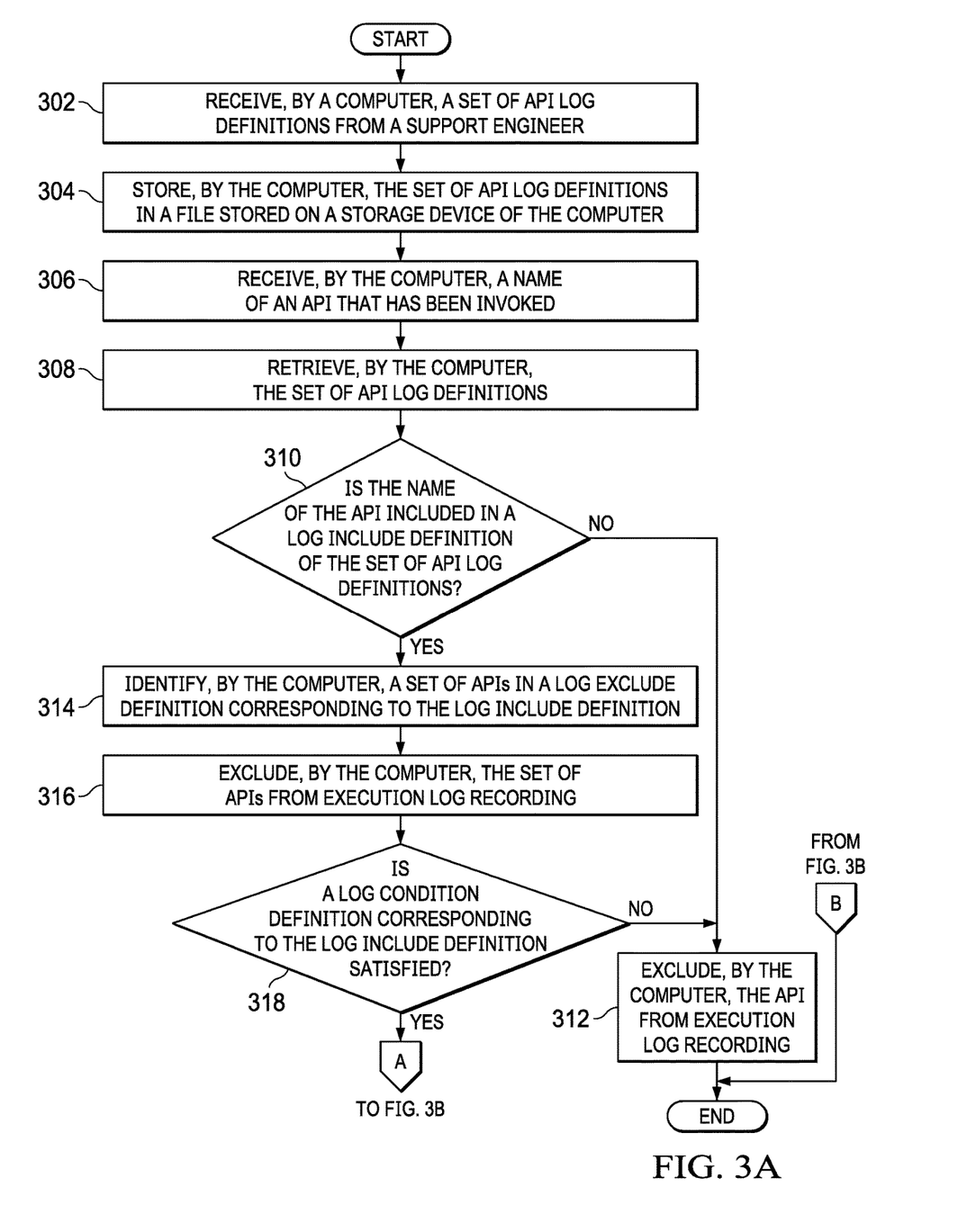
FIG. 3A-3B are a flowchart illustrating a process for managing API execution logging in accordance with an illustrative embodiment.
Figure 3B:
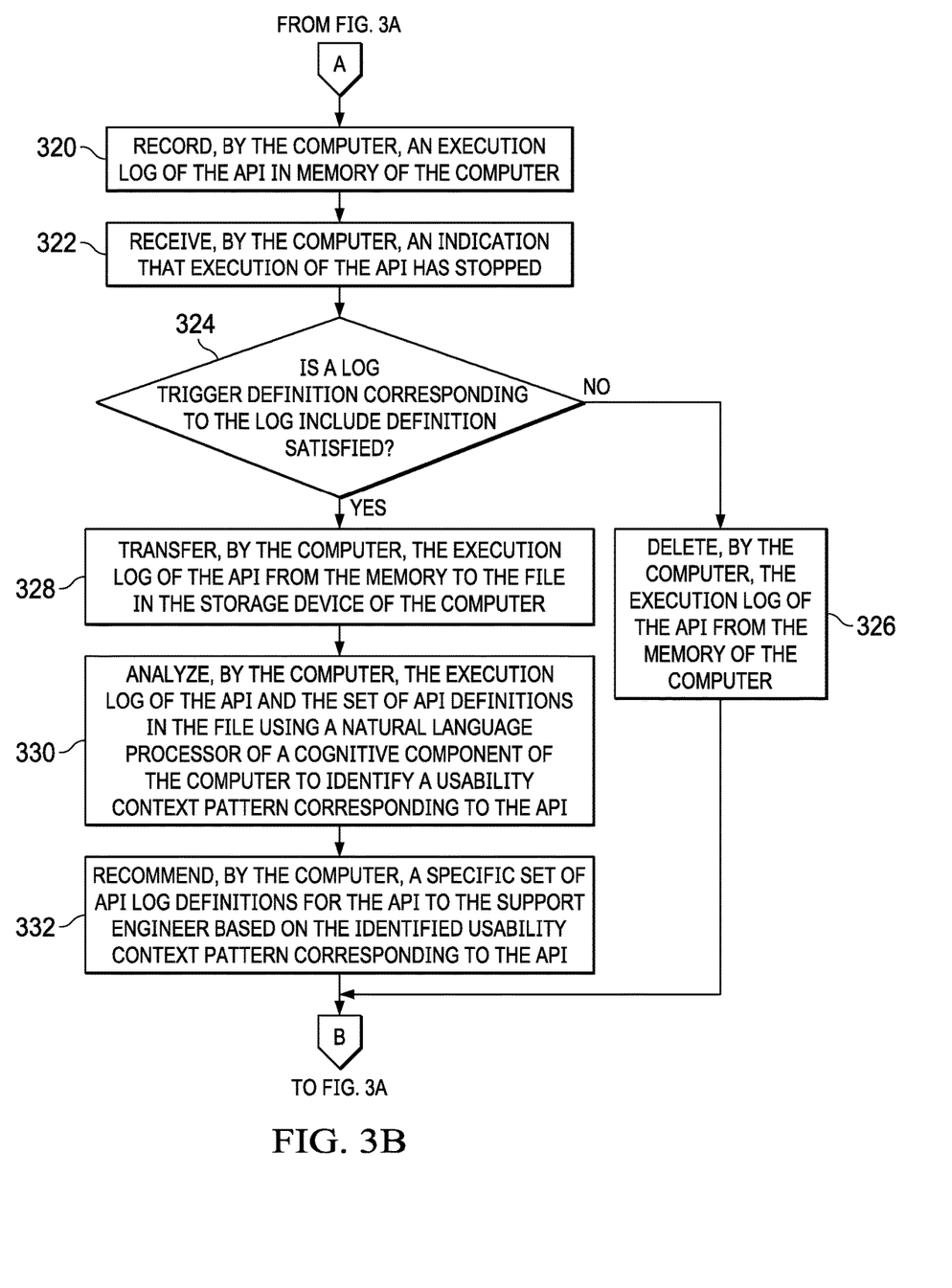

With reference now to FIG. 3A-3B, a flowchart illustrating a process for managing API execution logging is shown in accordance with an illustrative embodiment. The process shown in FIG. 3A-3B may be implemented in a computer, such as, for example, server 104 in FIG. 1 or data processing system 200 in FIG. 2.

The process begins when the computer receives a set of API log definitions from a support engineer (step 302). The computer stores the set of API log definitions in a file stored on a storage device of the computer (step 304). Subsequently, the computer receives a name of an API that has been invoked (step 306). The computer then retrieves the set of API log definitions (step 308).

Afterward, the computer makes a determination as to whether the name of the API is included in a log include definition of the set of API log definitions (step 310). If the computer determines that the name of the API is not included in the log include definition of the set of API log definitions, no output of step 310, then the computer excludes the API from execution log recording (step 312). Thereafter, the process terminates.

If the computer determines that the name of the API is included in the log include definition of the set of API log definitions, yes output of step 310, then the computer identifies a set of APIs in a log exclude definition corresponding to the log include definition (step 314). In addition, the computer excludes the set of APIs from execution log recording (step 316). However, it should be noted that the set of APIs may be a null set of APIs.

Further, the computer makes a determination as to whether a log condition definition corresponding to the log include definition is satisfied (step 318). If the computer determines that the log condition definition corresponding to the log include definition is not satisfied, no output of step 318, then the process returns to step 312 where the computer excludes the API from execution log recording. If the computer determines that the log condition definition corresponding to the log include definition is satisfied, yes output of step 318, then the computer records an execution log of the API in memory of the computer (step 320).

Subsequently, the computer receives an indication that execution of the API has stopped (step 322). Execution of the API may stop due to successful execution or occurrence of an exception, for example. Afterward, the computer makes a determination as to whether a log trigger definition corresponding to the log include definition is satisfied (step 324).

If the computer determines that the log trigger definition corresponding to the log include definition is not satisfied, no output of step 324, then the computer deletes the execution log of the API from the memory of the computer (step 326) and the process terminates thereafter. If the computer determines that the log trigger definition corresponding to the log include definition is satisfied, yes output of step 324, then the computer transfers the execution log of the API from the memory to the file in the storage device of the computer (step 328). In addition, the computer analyzes the execution log of the API and the set of API definitions in the file using a natural language processor of a cognitive component of the computer to identify a usability context pattern corresponding to the API (step 330). The usability context pattern identifies the support engineer's intent for usability of the specified API in the log include definition. Further, the computer recommends a specific set of API log definitions for the API to the support engineer based on the identified usability context pattern corresponding to the API (step 332). Thereafter, the process terminates.

Thus, illustrative embodiments of the present invention provide a computer-implemented method, computer system, and computer program product for managing API execution logging based on user-defined API log definitions that reduce an amount of information contained within a log file corresponding to a specified API listed in an API log include definition. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer system for managing application programming interface (API) execution logging based on API log definitions used to control recording of an execution log of an API, the computer system comprising:
a bus system;
a storage device connected to the bus system, wherein the storage device stores program instructions; and
a processor connected to the bus system, wherein the processor executes the program instructions to:
determine whether an API log trigger definition corresponding to an API log include definition is satisfied, wherein the API log include definition specifies one or more names of particular APIs for performing verbose level logging, and the API log trigger definition identifies conditions corresponding to the specified particular APIs in memory which is to be transferred to the storage device
transfer the execution log of the API from the memory to a file in the storage device in response to determining that the API log trigger definition corresponding to the API log include definition is satisfied;
analyze the execution log of the API and a set of API definitions in the file using natural language processing to identify a usability context pattern corresponding to the API; and
recommend a specific set of the API log definitions to be used to control execution log recording for a subsequent execution of the API based on the usability context pattern corresponding to the API, wherein the processor executes the program instruction to determine whether the API log trigger definition is satisfied in response to determining that execution of the API has stopped, wherein the API log definitions comprise the API log trigger definition and the API log include definition.

2. The computer system of claim 1, wherein the processor further executes the program instructions to: delete the execution log of the API from the memory in response to determining that the API log trigger definition corresponding to the API log include definition is not satisfied, wherein the API log trigger definition identifies a trigger condition corresponding to the verbose level logging of the specified particular API is to be written to the memory.

3. The computer system of claim 1, wherein the processor further executes the program instructions to:
receive the API log definitions from a user; and
store the API log definitions in the file stored on the storage device, wherein the API log definitions define the names of the specified particular APIs are to be logged and the conditions.

4. The computer system of claim 3, wherein the API log definitions further includes an API log exclude definition that specifies a given API to be excluded from the verbose level logging, and an API log condition definition that describes a condition under which the verbose level logging of the specified particular API is to be recorded.

5. The computer system of claim 4, wherein functioning of the computer system is improved by decreasing utilization of memory space for log data based on the API log include definition, decreasing a number of APIs being logged based on the API log exclude definition, decreasing a number and size of API execution logs based on the API log condition definition, and decreasing a number of the API execution logs stored and analyzed in the memory based on the API log trigger definition, which results in increased free disk space, decreased memory consumption, and decreased processor utilization during API execution data logging and analysis.

6. The computer system of claim 1, wherein the processor further executes the program instructions to:
receive a name of the API that has been invoked; and
retrieve the API log definitions in response to receiving the name of the API.

7. The computer system of claim 1, wherein the API is one of a representational state transfer application programming interface corresponding to a web service, and a call stack corresponding to an object-oriented program.

8. A computer program product for managing application programming interface (API) execution logging based on API log definitions used to control recording of an execution log of an API, the computer program product comprising a non-transitory computer readable storage medium having program instructions embodied therewith, the program instructions executable by a computer to cause the computer to perform a method comprising:
determining, by the computer, whether an API log trigger definition corresponding to an API log include definition is satisfied, wherein the API log include definition specifies one or more names of particular APIs for performing verbose level logging, and the API log trigger definition identifies conditions corresponding to the specified particular APIs in memory which is to be transferred to a storaqe device;
responsive to the computer determining that the API log trigger definition corresponding to the API log include definition is satisfied, transferring, by the computer, the execution log of the API from the memory to a file in the storage device of the computer;
analyzing, by the computer, the execution log of the API and a set of API definitions in the file using natural language processing to identity a usability context pattern corresponding to the API; and
recommending, by the computer, a specific set of the API log definitions to be used to control execution log recording for a subsequent execution of the API based on the usability context pattern corresponding to the API, wherein determining whether the API log trigger definition is satisfied is performed in response to determining that execution of the API has stopped, wherein the API log definitions comprise the API log trigger definition and the API log include definition.

9. The computer program product of claim 8, wherein the method further comprising: responsive to the computer determining that the API log trigger definition corresponding to the API log include definition is not satisfied, deleting, by the computer, the execution log of the API from the memory of the computer, wherein the API log trigger definition identifies a trigger condition under which data corresponding to the verbose level logging of the specified particular API is to be written to the memory.

10. The computer program product of claim 8, wherein the method further comprising: receiving, by the computer, the API log definitions from a user; and storing, by the computer, the API log definitions in the file stored on the storage device of the computer, wherein the API log definitions define the names of the specified particular APIs are to be logged and the conditions.

11. The computer program product of claim 10, wherein the API log definitions includes an API log exclude definition that specifies a given API to be excluded from the verbose level logging, and an API log condition definition that describes a condition under which the verbose level logging of the specified particular API is to be recorded.

12. The computer program product of claim 11, wherein the API log include definition specifies a name of the API to be included in verbose level execution logging, the API log exclude definition specifies names of APIs to be excluded from the verbose level execution logging, the API log condition definition describes conditions under which the verbose level execution logging is to be recorded in the memory, and the API log trigger definition describes the conditions corresponding to the detailed verbose level execution logging recorded in the memory is to be transferred to one of a hard disk file or a log server.

13. The computer program product of claim 12, wherein the method further comprising:
   receiving, by the computer, the name of the API that has been invoked; and
   retrieving, by the computer, the API log definitions in response to receiving the name of the API.

14. The computer program product of claim 11, wherein functioning of the computer system is improved by decreasing utilization of memory space for log data based on the API log include definition, decreasing a number of APIs being logged based on the API log exclude definition, decreasing a number and size of API execution logs based on the API log condition definition, and decreasing a number of the API execution logs stored and analyzed in the memory based on the API log trigger definition, which results in increased free disk space, decreased memory consumption, and decreased processor utilization during API execution data logging and analysis.

15. The computer program product of claim 8, wherein the API is one of a representational state transfer application programming interface corresponding to a web service, and a call stack corresponding to an object-oriented program.

\* \* \* \* \*